United States Patent [19]
Obara et al.

[11] Patent Number: 5,877,601
[45] Date of Patent: Mar. 2, 1999

[54] CONTROL SYSTEM FOR ELECTRIC VEHICLE AND CONTROL METHOD THEREFOR IN WHICH AN INVERTER RELAY IS CONTROLLED AT THE TIME OF ITS RE-CLOSING AFTER BEING DISCONNECTED

[75] Inventors: Sanshiro Obara, Toukai-mura; Hiroshi Katada, Hitachinaka; Nobunori Matsudaira, Hitachi; Eiichi Ohtsu, Mito; Ryoso Masaki, Hitachi, all of Japan

[73] Assignee: Hitachi, Ltd., Tokyo, Japan

[21] Appl. No.: 845,792

[22] Filed: Apr. 25, 1997

[30] Foreign Application Priority Data

Apr. 26, 1996 [JP] Japan ..................... 8-107314

[51] Int. Cl.$^6$ ........................................ H02P 3/00
[52] U.S. Cl. ........................ 318/139; 318/801; 318/376
[58] Field of Search ....................... 318/798–815, 318/722, 254, 376, 139, 439, 432; 307/10.1–10.7; 180/60, 65.1–65.8; 361/23, 31

[56] References Cited

U.S. PATENT DOCUMENTS

| | | | |
|---|---|---|---|
| 3,694,730 | 9/1972 | Hoft et al. ........................... | 363/139 |
| 3,781,614 | 12/1973 | Mokrytzki et al. ................ | 318/801 |
| 3,890,551 | 6/1975 | Plunkett ............................. | 318/376 |
| 4,093,900 | 6/1978 | Plunkett ............................. | 318/370 |
| 4,616,166 | 10/1986 | Cooper et al. ..................... | 318/712 |
| 5,241,255 | 8/1993 | Oshima et al. .................... | 318/801 |
| 5,420,491 | 5/1995 | Kanzaki et al. ................... | 318/727 |
| 5,513,058 | 4/1996 | Hollenbeck ........................ | 361/36 |

FOREIGN PATENT DOCUMENTS 6-315201   8/1994   Japan .

*Primary Examiner*—Jonathan Wysocki
*Attorney, Agent, or Firm*—Evenson, McKeown, Edwards & Lenahan, P.L.L.C.

[57] ABSTRACT

In an electric vehicle having a synchronous motor as the driving source, a control system and a control method for the electric vehicle can prevent over current in the main circuit or over charging of the battery at the re-closing of an opened inverter relay and is always capable of operating the powertrain system in a better condition. A control method for an electric vehicle having an inverter for supplying a direct current electric power from a battery to the synchronous motor, a smoothing capacitor, connected to the inverter in parallel for smoothing the direct current electric power, an inverter control circuit and an inverter relay for connecting and disconnecting the inverter and the smoothing capacitor to and from the battery. The inverter is controlled so as to prevent current from flowing into or flowing out of the inverter until the re-closing operation of the inverter relay is completed when the opened inverter relay is re-closed.

6 Claims, 7 Drawing Sheets

$E_0$ ··· INDUCED e.m.f. OF MAGNET   $V_1$ ··· MOTOR VOLTAGE
$\delta$ ··· LOAD ANGLE   $\psi$ ··· POWER FACTER ANGLE
$\beta$ ··· ADVANCE ANGLE

CONTROL SYSTEM FOR ELECTRIC VEHICLE AND CONTROL METHOD THEREFOR IN WHICH AN INVERTER RELAY IS CONTROLLED AT THE TIME OF ITS RE-CLOSING AFTER BEING DISCONNECTED

BACKGROUND OF THE INVENTION

The present invention relates to a control method and a control system for an electric vehicle having an inverter for converting a direct current electric power such as an electric power of a battery into an alternating current electric power source and a synchronous motor as the driving force of the vehicle, and more particularly relates to a control method and a control system for an electric vehicle having a permanent-magnet type synchronous motor as the driving force of the vehicle.

Development of permanent-magnet type synchronous motors for driving an electric vehicle has been progressing. The efficiency of the permanent-magnet type synchronous motor can be increased in a low speed and low torque region compared to an induction motor. An electric vehicle driving system using such a permanent-magnet type synchronous motor is disclosed, for example, in Japanese Patent Laid Open Application No. 6-315201.

In an electric vehicle, for example, an electric automobile, there are some cases in which the motor may be driven at a high speed above a maximum controllable rotating speed during a coasting operation on a descending road.

In a case of controlling a synchronous motor generally used in the industrial field, when a speed of the motor is increased and exceeds the controllable range, the motor is controlled by being judged as to be in an abnormal condition. In a case of an electric vehicle, the motor is controlled by repeating to drive it up to a maximum allowable speed for the power-train system and then to operate it in a normal re-operation within the controllable range as the speed of the motor is decreased. When the motor is driven at a speed above the maximum controllable speed, a protective relay (hereinafter referred to as an inverter relay) provided between an inverter and a battery is operated. That is, it can be considered that the inverter relay is disconnected to protect the power train control system of the electric vehicle when the motor is driven at a speed above the maximum controllable speed.

The inverter relay is for connecting or disconnecting the inverter and a smoothing capacitor to and from the battery, and is connected and disconnected according to a key switch IGN signal.

In the electric vehicle power train system, the inverter relay is disconnected under the following conditions during driving.

(1) Speed of the motor exceeds the controllable speed, (2) the key switch IGN is in OFF state, or (3) an abnormal condition occurs anywhere except for in the inverter (an abnormal condition capable of re-power-driving).

After that, it is necessary that the inverter relay is re-closed during running in order to re-operate the inverter when the speed of the motor is decreased to a value within the controllable range from the above state (1), the IGN described in the above item (2) is brought in ON state and a re-driving command described in the above item (3) is generated.

SUMMARY OF THE INVENTION

An object of the present invention is to provide a control system and a control method for an electric vehicle which is capable of re-operating a power-train system in a better condition without producing an over current in a main circuit composed of a battery, an inverter and a motor at re-closing the inverter relay described above.

The present invention is characterized by a control method for an electric vehicle having a permanent magnet type synchronous motor for driving the electric vehicle, an inverter for converting a direct current electric power from a battery into an alternating electric power and for supplying the alternating electric power to the synchronous motor, a smoothing capacitor for smoothing the direct current electric power and being connected to the inverter in parallel, an inverter control means for controlling the inverter based on a torque reference and a motor current, an inverter relay for connecting and disconnecting the inverter and the smoothing capacitor to and from the battery. The inverter performs zero current operation, that is, the inverter is controlled so as to prevent current from flowing into power elements of the inverter from the battery until a re-closing operation of the inverter relay is completed and the voltage of the smoothing capacitor is recovered to a voltage of the battery when the inverter relay is re-closed.

Another characteristic of the present invention is that as the above-mentioned zero current operation of the inverter, all phases of power elements in the positive side of the inverter are brought into conduction or all phases of power elements in the negative side of the inverter are brought into conduction.

A further characteristic of the present invention is that in a control system for an electric vehicle having a permanent magnet type synchronous motor for driving the electric vehicle, an inverter for converting a direct current electric power from a battery into an alternating electric power and for supplying the alternating electric power to the synchronous motor, a smoothing capacitor for smoothing the direct current electric power and being connected to the inverter in parallel, inverter control means for controlling the inverter based on a torque reference and a motor current, inverter relays for connecting and disconnecting the inverter and the smoothing capacitor to and from the battery. The control system comprises an inverter relay re-closing means for controlling the inverter so as to prevent current from flowing into and out of the inverter until a re-closing operation of the inverter relay is completed and the voltage of said smoothing capacitor is recovered to a voltage of the battery when the inverter relay is re-closed after being disconnected.

DETAILED DESCRIPTION OF THE PREFERRED EMBODIMENTS

An embodiment of a driving system for an electric vehicle in accordance with the present invention will be described below, referring to the accompanying drawings.

Figure 1:
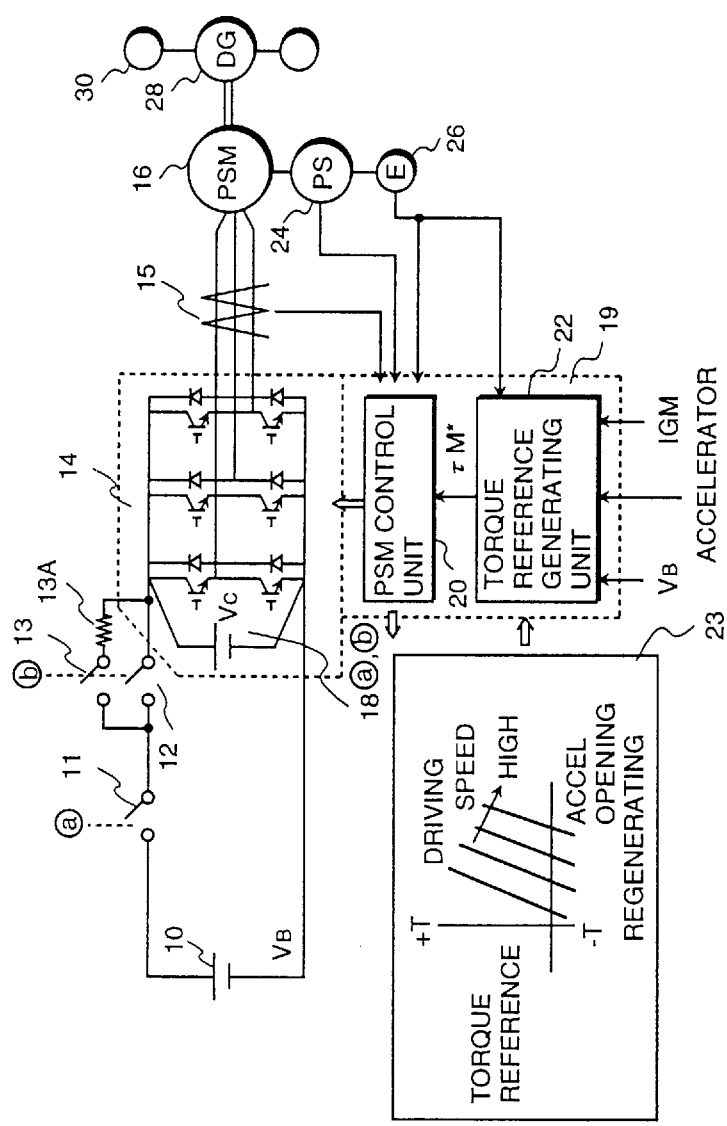
FIG. 1 is a circuit diagram showing the construction of an embodiment of a control system for an electric vehicle in accordance with the present invention.

FIG. 1 is a circuit diagram showing the construction of an embodiment of a driving system for an electric vehicle in accordance with the present invention. Referring to FIG. 1, a battery 10 is connected to an inverter 14 through a main relay 11, and an inverter relay 12. The inverter 14 converts a direct current electric power from the battery 10 into an alternating current electric power to supply a synchronous motor 16 for driving the electric vehicle. The synchronous motor (hereinafter referred to as "motor") 16 is of a permanent-magnet type, and comprises a rotor having a plurality of magnets embedded in the periphery and a rotating shaft, and a stator having stator windings for respective phases of U, V, W.

A smoothing capacitor 18 for smoothing the direct current is connected between the main relay 11 and the inverter 14. A pre-charge relay 13 and a pre-charge resistor 13A are connected in parallel to the inverter relay 12. The pre-charge resistor 13A is to prevent over-current from flowing through the smoothing capacitor 18 at re-closing of the pre-charge relay 13.

The inverter 14 has a plurality of power elements to which PWM (Pulse Width Modulation) control is performed by an inverter control unit 19. The inverter control unit 19 has a PSM control unit 20 and a torque reference generating unit 22. The torque reference generating unit 22 has an inverter relay control unit which will be described later. In the normal condition, the inverter relay 12 is operated by the inverter relay control unit 19 to connect the inverter 14 and the smoothing capacitor 18 to the battery 10. The inverter relay 12 is disconnected when (1) the speed of the motor exceeds the controllable speed, (2) the key switch signal IGN is in an OFF state, or (3) an abnormal condition occurs anywhere except for in the inverter in addition to when ON-OFF control is performed by the key switch signal IGN at starting and at stopping.

The torque reference generating unit 22 generates a torque reference value $\tau_{M^*}$ corresponding to an accelerator opening value based on the accelerator reference converting unit 23 during both power driving and regenerating running, and the torque reference value $\tau_{M^*}$ is transmitted to the PSM control unit 20.

Motor current of the motor 16 is detected with a current detector 15. Pole position from the motor 16 is detected with a pole position sensor 24, and rotating angle is detected with an encoder 26. Then, these detected values are transmitted to the PSM control unit 20. The rotating angle detected by the encoder 26 is also transmitted to the torque reference generating unit 22.

The PSM control unit 20 performs PWM control to power elements of the inverter 14 based on the detected values of the current detector 15, the pole position sensor 24 and the encoder 26, as well as and the torque reference value $\tau_{M^*}$ transmitted from the torque reference generating unit 22. The reference character 28 indicates a differential gear of the electric vehicle.

Hereinafter, in the specification of the present invention, $V_B$ indicates battery voltage, $V_1$ indicates inverter output voltage, $V_0$ indicates induced electromotive force of the synchronous motor and $V_C$ indicates smoothing capacitor voltage.

Figure 2:
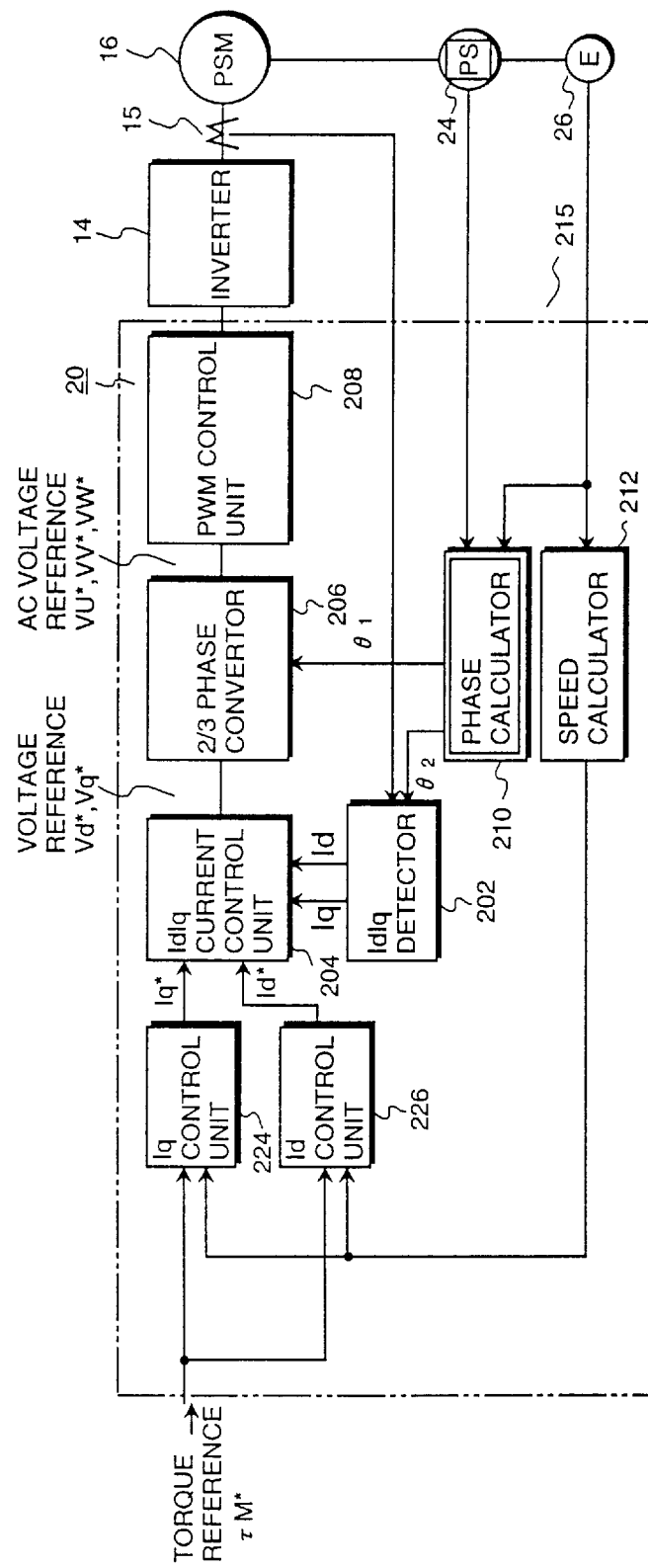
FIG. 2 is a circuit diagram showing the detailed construction of the PSM control unit of FIG. 1.

FIG. 2 is a block diagram showing the internal process of the PSM control unit 20. The PSM control unit 20 comprises an $I_d I_q$ detector 202, an $I_d I_q$ current control unit 204, a 2/3 phase converter 206, a PWM control unit 208, a phase calculator 210 and a speed calculator 212. The speed calculator 212 is connected to the encoder 26, and the phase calculator 210 is connected to the pole position sensor 24. The PSM control unit 20 further comprises an $I_q$ control unit 224 and an $I_d$ control unit 226.

In the PSM control unit 20, a q-axis current reference value $I_{q^*}$ equivalent to a torque component current is calculated by the $I_q$ control unit 224 for calculating the q-axis current reference value $I_{q^*}$ based on the torque reference value $\tau M^*$. On the other hand, a d-axis current reference value $I_{d^*}$ is calculated by the $I_d$ control unit 226 based on the torque reference value $\tau M^*$ and a rotating speed calculated by the speed calculator 212 using a pulse signal from the encoder 26. As described above, the $I_d$, $I_q$ control units in the PSM control unit 20 calculate the current reference values $I_{q^*}$, $I_{d^*}$ necessary for high efficiency control based on the rotating speed.

The $I_d I_q$ detector 202 calculates d- and q-axis currents $I_d$, $I_q$ through performing 3-phase/2-phase coordinate transformation processing of three-phase alternating current of the motor current detected by the current detector 15. The $I_d I_q$ current control unit 204 calculates voltage reference values $V_{q^*}$, $V_{d^*}$ through performing proportional or proportional-integral control processing based on these detected values and the current reference values $I_{q^*}$, $I_{d^*}$.

Further, in the 2/3-phase converter 206, three-phase alternating current reference values VU*, VV*, VW* are calculated through 2-phase/3-phase coordinate transformation. The PWM control unit 20 generates a PWM signal for the inverter 14 through performing comparison processing with a carrier wave signal of triangular wave signal shape using the three-phase alternating current reference values VU*, VV*, VW* to drive the inverter 14. In such a manner described above, the motor currents are controlled to the current reference values $I_{q^*}$, $I_{d^*}$ by applying the PWM controlled voltage to the motor 16.

Phase angles $\theta_1$, $\theta_2$ used in the coordinate transformation processes in the 2/3-phase converter 206 and the $I_d I_q$ detector 202 are calculated in the phase calculator 24 using outputs of the pole position sensor 24 which outputs a signal having the same phase as an induced electromotive force of the motor 16 and the encoder 26 which outputs a rotating angle signal (pulse signal).

Figure 3:
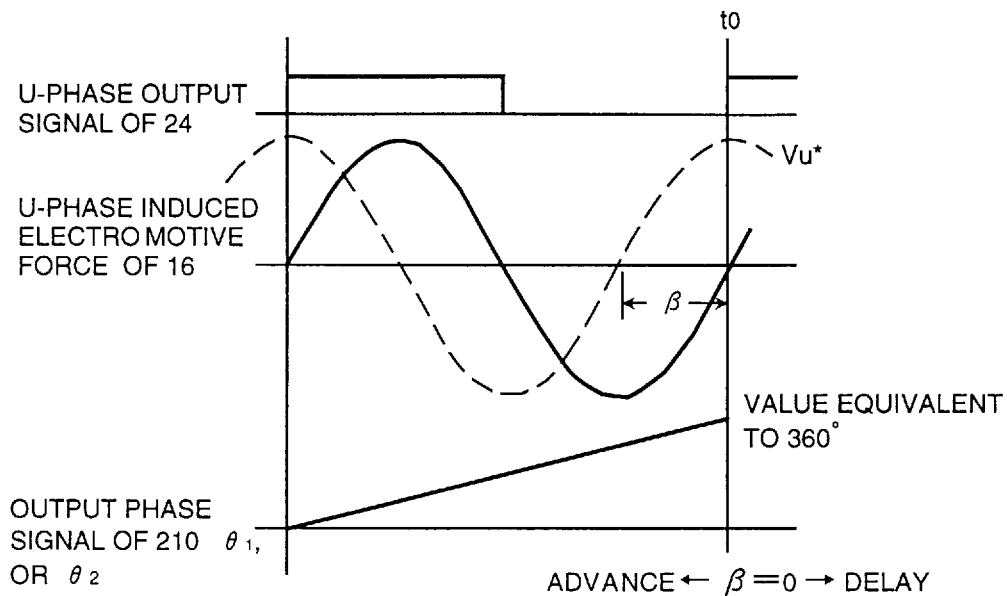
FIG. 3 is a chart showing the phase relationship between an output signal of the pole position sensor and an output signal of the encoder of FIG. 2.

FIG. 3 shows the phase relationship between the output signal of the pole position sensor 24 and the output signal of the encoder 26. A phase signal of the phase calculator 210 obtained by accumulating the pulse signals of the encoder 26 is brought into synchronism with the induced electromotive force of the motor 16 using the pole position signal as shown by the saw-tooth shaped wave in FIG. 3. By doing such processing, the motor 16 is controlled so as to have a torque of the torque command value $\tau M^*$ and a high efficiency with minimum loss.

Figure 4:
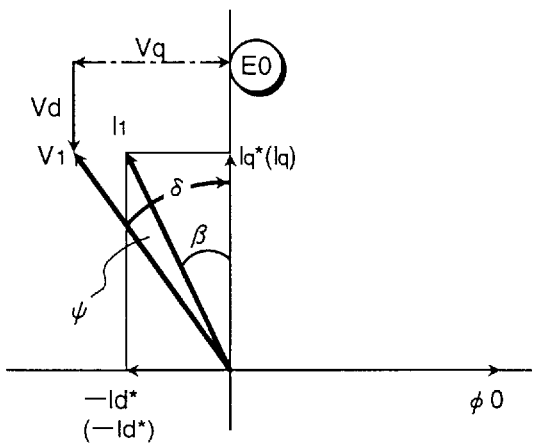
FIG. 4 is a vector diagram during normal running operation.

FIG. 4 shows a vector diagram of the motor 16 in the state at that time. The motor is controlled with an optimum advance angle β (β=tan−1 ($I_{d*}/I_{q*}$)) using $I_{d*}$, $I_{q*}$ for obtaining a high efficiency point. The reference point of the advance angle β is a time point to shown in FIG. 3, and the dashed line indicates an alternating current voltage $V_{u*}$ which is controlled at the time point $t_0$.

The output torque of the motor 16 can be expressed by Equation (1).

$$\tau M = P_n[\{V_0 + (1-\rho) L_d I_d\} I_q] \quad (1)$$

where $P_n$ is a constant, ρ is a ratio of $I_q$ to $I_d$ and $V_0$ is an induced electromotive force.

In Equation (1), the first term in the right side of the equation is called a synchronous torque and the second term is called a reactance torque.

Figure 5:
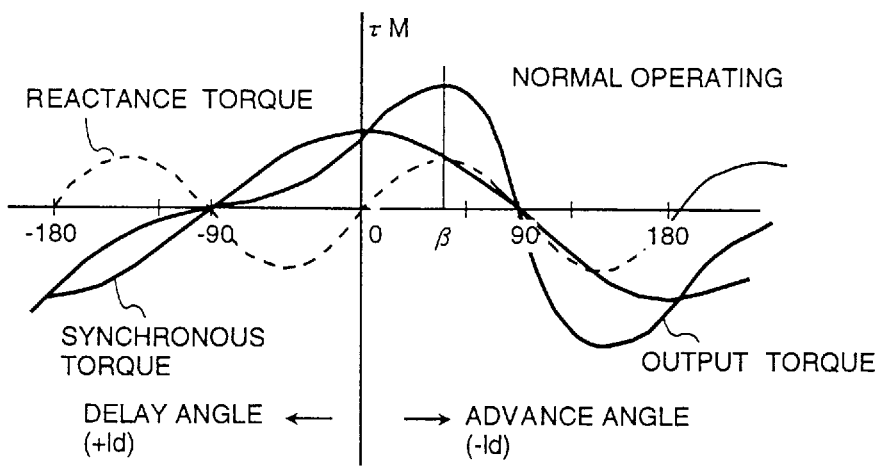
FIG. 5 is a chart showing the state of the output torque during normal running operation.

FIG. 5 shows the torque characteristics of these torques in taking the advance angle β in the abscissa when the voltage applied to the motor is fixed to a constant. The output torque τM is the sum of the synchronous torque and the reactance torque. As shown in the figure, in the synchronous motor having a reverse protruding polar characteristic in which the ρ in Equation (1) is larger than 1 (one), since the maximum torque is generated at a point near the advance angle β of 45 degrees, the motor is controlled at an advance angle above the angle β. The electric vehicle is driven in such an operation.

Figure 6:
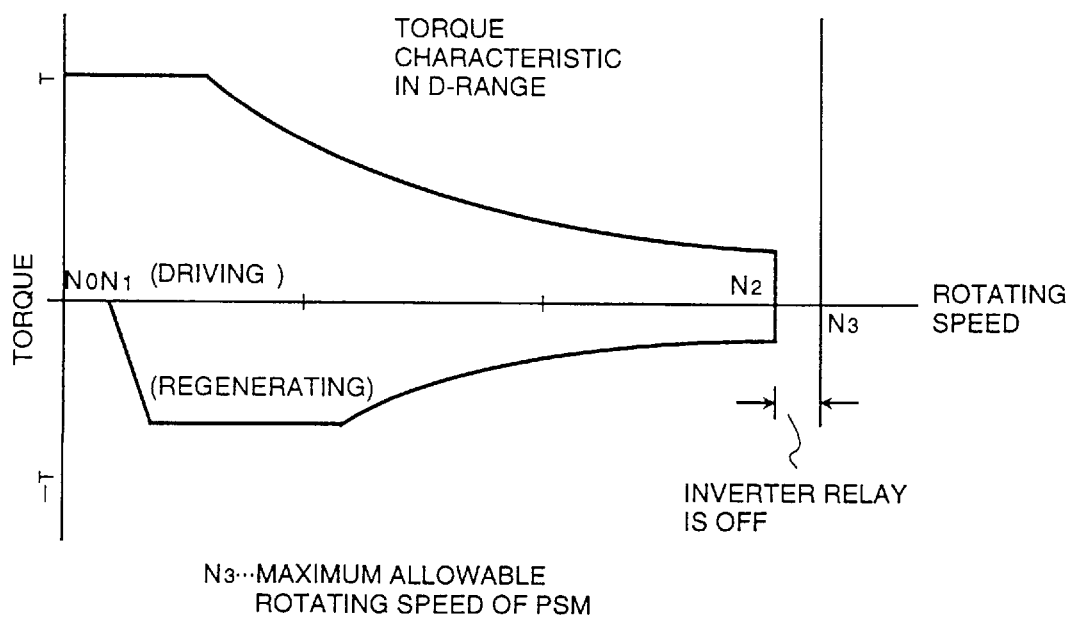
FIG. 6 is a graph showing the torque characteristic of a motor in D-range.

FIG. 6 shows torque during power driving and torque during regenerating braking-running as the torque characteristic of the synchronous motor in the control system in accordance with the present invention when the gearbox 28 is in D (drive) range. The line $N_0$–$N_2$ expresses the power driving controllable range, and regenerating control is performed on the line $N_2$–$N_1$. Therefore, the maximum limit of the controllable range is a motor rotating speed of $N_2$.

The maximum allowable motor rotating speed of the PSM in accordance with the present invention is to be expressed by $N_3$. The maximum allowable motor rotating speed $N_3$ is determined by taking the maximum inclination of public load and an aerodynamic resistance of the vehicle body into consideration.

In the control system in accordance with the present invention, the inverter relay 12 is ON-OFF-controlled by the inverter control unit 19 in such a manner that the inverter 14 and the smoothing capacitor 18 are connected to or disconnected from the battery 10. The inverter relay 12 is connected or disconnected in conjunction with the ON-OFF of the key-switch. When a rotating speed of the synchronous motor 16 exceeds $N_2$ and approaches $N_3$, the inverter relay 12 is disconnected since the speed exceeds the controllable range. When the electric vehicle is decelerated by a braking operation or a change in the load condition and the rotating speed of the motor becomes smaller than $N_2$ after the inverter relay 12 is opened, the inverter relay 12 is re-closed in order to restart smooth driving.

Description will now be made of the construction and the operation for re-closing the inverter relay 12 after opening the inverter relay, referring to FIG. 7.

Figure 7:
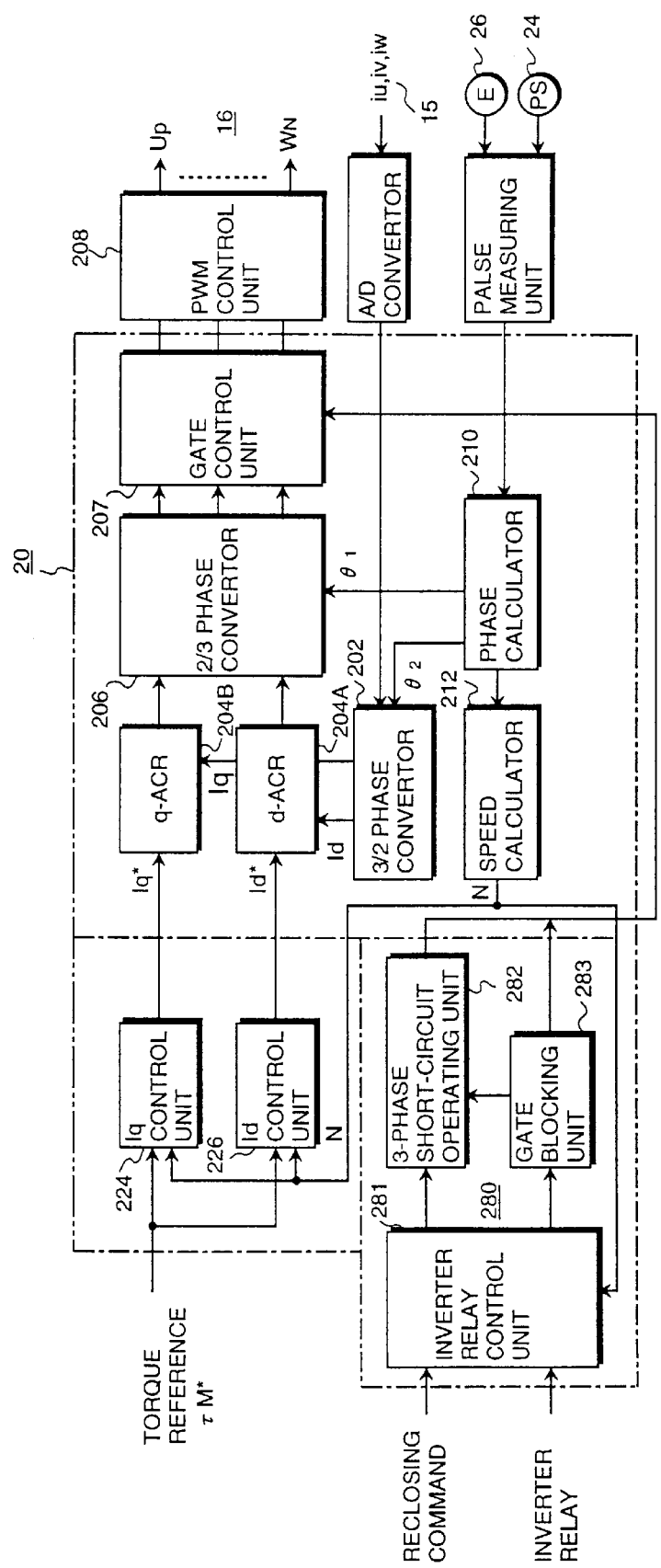
FIG. 7 is a detailed diagram showing portions relating to control of an inverter relay in a PSM control unit and a torque reference generating unit of an inverter control means.

FIG. 7 is a detailed diagram showing portions relating to control of the inverter relay 12 in the PSM control unit 20 and the torque reference generating unit 22 of the inverter control means 19. The explanation of the basic construction and operation of the inverter relay will be omitted here since they are the same as in FIG. 2.

An inverter relay re-closing control means 280 comprises an inverter relay control unit 281, a three-phase short-circuit operating signal generating unit 282 and a gate block signal generating unit 283.

Figure 8:
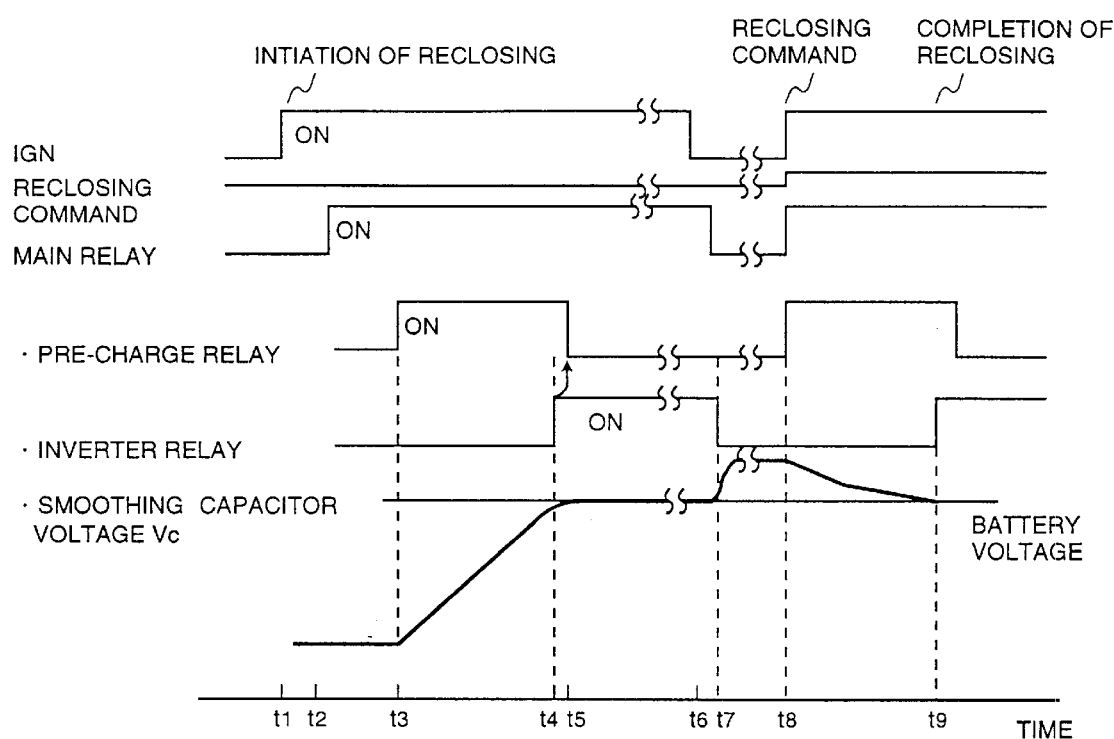
FIG. 8 is a time chart showing operations of various portions when an inverter relay according to the present invention is connected or disconnected.

FIG. 8 is a time chart showing operations of various portions when the inverter relay is connected or disconnected in an interlocking relationship with the ON-OFF of the key-switch. As the key-switch (IGN) is turned on at time $t_1$, the main relay 11 and the pre-charge relay 13 are closed at $t_2$, $t_3$ interlocking with the turning-on of the key-switch. Charge current then flows into the smoothing capacitor 18 through the pre-charge resistor 13A. Then, when the voltage $V_C$ of the smoothing capacitor reaches a predetermined value at time $t_4$, the inverter relay 12 is turned on at $t_4$ and the pre-charge relay 13 is turned off at $t_5$. In such a state, normal control to the inverter 14 is performed by the inverter control unit 19 to drive the electric vehicle.

When the key-switch is turned off at $t_6$ due to the aforementioned reason and the inverter relay is opened at $t_7$ and a re-closing command is generated at $t_8$ while the electric vehicle is being driven in such a state, it is necessary to re-close the inverter relay at $t_9$.

Figure 9:
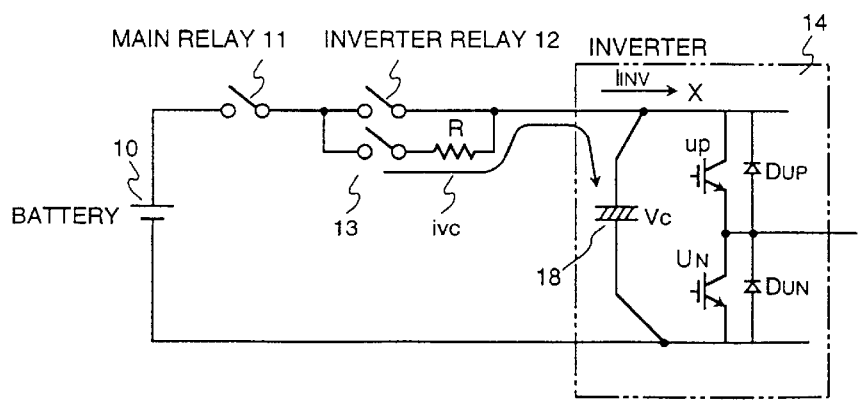
FIG. 9 is a diagram explaining the operation of the re-closing control of an inverter relay.

As described in FIG. 9, the control method of re-closing the opened inverter relay is to control so as to prevent charge current $I_{INV}$ from flowing out of the battery 10 into the power elements of the inverter 14 by bringing all the power elements into non-conduction until the voltage $V_C$ of the smoothing capacitance is recovered to the battery voltage $V_B$ and re-closing operation of the inverter relay 12 is completed. By doing so, the voltage $V_C$ of the smoothing capacitance is maintained at a value higher than a predetermined value shown by a dashed line at the re-closing time of the inverter relay, that is, at time $t_9$ in FIG. 8. Thereby, it is possible to prevent over current from flowing into the inverter at re-closing time.

Figure 10:
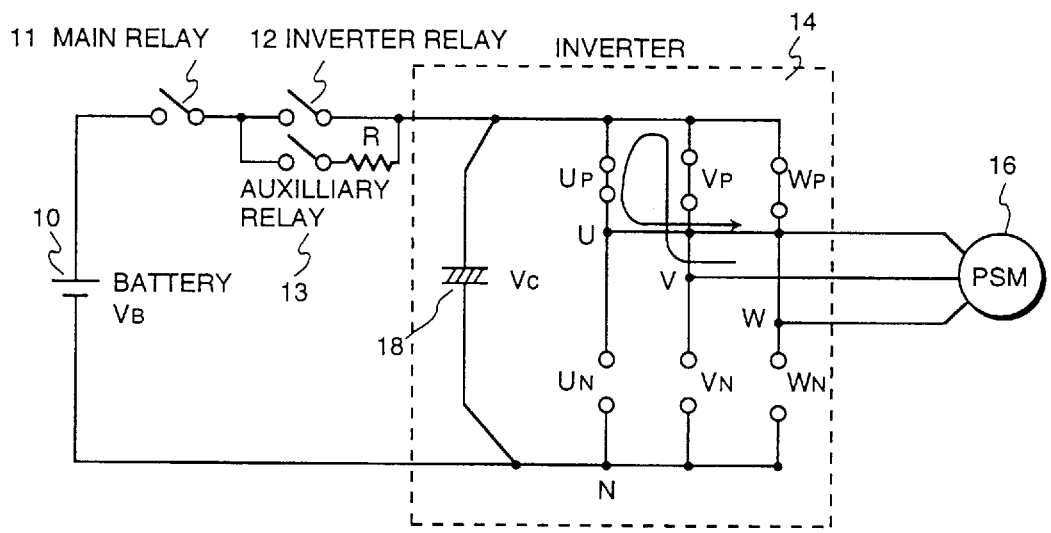
FIG. 10 is a diagram explaining the operation of the re-closing control of an inverter relay.

Further, in order to prevent charge current from flowing into the power elements of the inverter out of the battery until re-closing operation of the inverter relay 12 is completed, three-phase short current is allowed to flow in the windings of the motor 16 by bringing the power elements ($U_p$, $V_p$, $W_p$) connected to the positive side of the inverter 14 into conduction. Otherwise, it may be possible that three-phase short current is allowed to flow in the windings of the motor 16 by bringing the power elements ($U_n$, $V_n$, $W_n$) connected to the negative side of the inverter 14 into conduction, as shown in FIG. 10.

By operating in such a manner, it is possible to prevent over current from flowing into the battery out of the motor through the diodes of the inverter due to re-closing of the inverter relay, that is, to prevent over charge of the battery.

Figure 11:
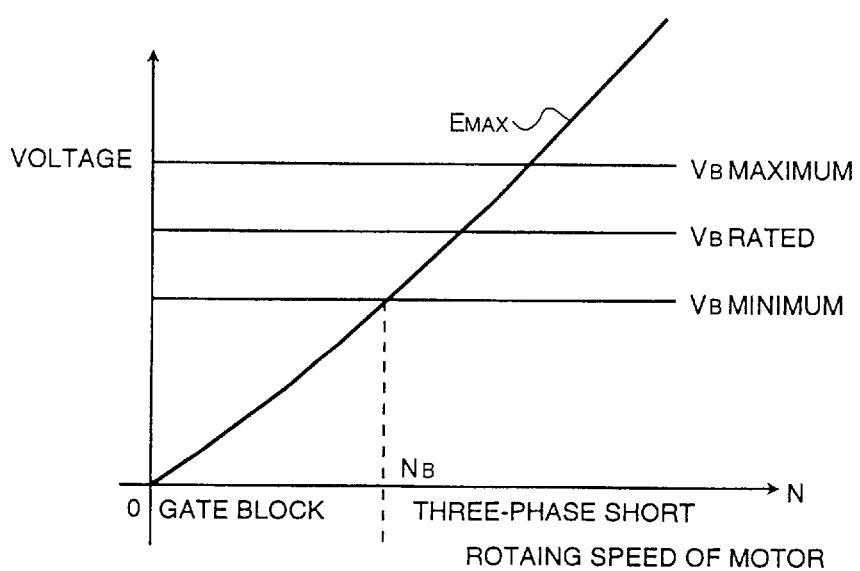
FIG. 11 is a graph showing the relationship between battery voltage $V_b$ and maximum value $E_{MAX}$ of induced electromotive force E of a synchronous motor.

In a case where the rotating speed of the motor is below $N_B$ and the maximum value $E_{MAX}$ of induced electromotive force by the rotation of the motor is below the minimum assured voltage of the battery, the gate block, that is, all the power elements of the inverter 14 are brought into non-conduction state until the re-closing operation of the inverter relay 12 is completed, as shown in FIG. 9 and FIG. 11. In this case, since the maximum value $E_{MAX}$ of the induced electromotive force of the motor is lower than the battery voltage, it is possible to prevent over current from flowing out of the battery by bringing all the power elements into a non-conduction state.

As having been described above, according to the present invention, it is possible to provide a control system and a control method for an electric vehicle which can prevent over current in the main circuit or over charging of the battery at re-closing of an opened inverter relay and is capable of operating the power-train system in a better condition.

What is claimed is:

1. A control method for an electric vehicle having a permanent magnet type synchronous motor for driving the electric vehicle, an inverter for converting a direct current electric power from a battery into an alternating electric power and for supplying the alternating electric power to said synchronous motor, a smoothing capacitor for smoothing said direct current electric power and being connected to said inverter in parallel, inverter control means for controlling said inverter based on a torque reference and a motor current, inverter relays for connecting and disconnecting said inverter and said smoothing capacitor to and from said battery, wherein in a case when said inverter relay is re-closed after being disconnected while said synchronous motor is rotating, three-phase short circuit current is allowed to flow to said synchronous motor by bringing any one of a power element connected to a positive voltage side of said inverter and a power element connected to a negative voltage side of said inverter into conduction until the re-closing operation of said inverter relay is completed and the voltage of said smoothing capacitor is recovered to a voltage of said battery.

2. A control method for an electric vehicle having a permanent magnet type synchronous motor for driving the electric vehicle, an inverter for converting a direct current electric power from a battery into an alternating electric power and for supplying the alternating electric power to said synchronous motor, a smoothing capacitor for smoothing said direct current electric power and being connected to said inverter in parallel, inverter control means for controlling said inverter based on a torque reference and a motor current, inverter relays for connecting and disconnecting said inverter and said smoothing capacitor to and from said battery, wherein in a case when said inverter relay is re-closed after being disconnected where a speed of said synchronous motor is higher than a value in which a maximum value of induced electromotive force produced by rotation of said synchronous motor exceeds any one of said battery voltage and a minimum assurance voltage, three-phase short-circuit current is allowed to flow to said synchronous motor by bringing any one of a power element connected to a positive voltage side of said inverter and a power element connected to a negative voltage side of said inverter into conduction until the re-closing operation of said inverter relay is completed and the voltage of said smoothing capacitor is recovered to a voltage of said battery.

3. A control method for an electric vehicle having a permanent magnet type synchronous motor for driving the electric vehicle, an inverter for converting a direct current electric power from a battery into an alternating electric power and for supplying the alternating electric power to said synchronous motor, a smoothing capacitor for smoothing said direct current electric power and being connected to said inverter in parallel, inverter control means for controlling said inverter based on a torque reference and a motor current, inverter relays for connecting and disconnecting said inverter and said smoothing capacitor to and from said battery, wherein in a case when said inverter relay is re-closed after being disconnected where a speed of said synchronous motor is higher than a value in which a maximum value of induced electromotive force produced by rotation of said synchronous motor exceeds any one of said battery voltage and a minimum assurance voltage, all power elements of said inverter are brought into non-conduction until the re-closing operation of said inverter relay is completed and the voltage of said smoothing capacitor is recovered to a voltage of said battery.

4. A control system for an electric vehicle having a permanent magnet type synchronous motor for driving the electric vehicle, an inverter for converting a direct current electric power from a battery into an alternating electric power and for supplying the alternating electric power to said synchronous motor, a smoothing capacitor for smoothing said direct current electric power and being connected to said inverter in parallel, inverter control means for controlling said inverter based on a torque reference and a motor current, inverter relays for connecting and disconnecting said inverter and said smoothing capacitor to and from said battery, which comprises:

an inverter relay re-closing means for controlling said inverter so as to prevent current from flowing into and out of said inverter until a re-closing operation of said inverter relay is completed and the voltage of said smoothing capacitor is recovered to a voltage of said battery when said inverter relay is re-closed after being disconnected while said synchronous motor is rotating, wherein said inverter relay re-closing means is constructed in such a structure that three-phase short circuit current is allowed to flow to said synchronous motor by bringing any one of a power element connected to a positive voltage side of said inverter and a power element connected to a negative voltage side of said inverter into conduction until the re-closing operation of said inverter relay is completed in order to prevent charge current from flowing out of power elements of said inverter into said battery.

5. A control system for an electric vehicle according to claim 4, wherein said inverter relay re-closing means is constructed in such a structure that in a case where a speed of said synchronous motor is higher than a value in which a maximum value of induced electromotive force produced by rotation of said synchronous motor exceeds any one of said battery voltage and a minimum assurance voltage, three-phase short-circuit current is allowed to flow to said synchronous motor by bringing any one of a power element connected to a positive voltage side of said inverter and a power element connected to a negative voltage side of said inverter into conduction until the re-closing operation of said inverter relay is completed in order to prevent charge current from flowing out of power elements of said inverter into said battery.

6. A control system for an electric vehicle having a permanent magnet type synchronous motor for driving the electric vehicle, an inverter for converting a direct current electric power from a battery into an alternating electric power and for supplying the alternating electric power to said synchronous motor, a smoothing capacitor for smoothing said direct current electric power and being connected to said inverter in parallel, inverter control means for controlling said inverter based on a torque reference and a motor current, inverter relays for connecting and disconnecting said inverter and said smoothing capacitor to and from said battery, which comprises:

an inverter relay re-closing means for controlling said inverter so as to prevent current from flowing into and out of said inverter until a re-closing operation of said inverter relay is completed and the voltage of said smoothing capacitor is recovered to a voltage of said battery when said inverter relay is re-closed after being disconnected while said synchronous motor is rotating, wherein said inverter relay re-closing means is constructed in such a structure that all power elements of said inverter are brought into non-conduction until the re-closing operation of said inverter relay is completed in order to prevent charge current from flowing out of said battery into said power elements of said inverter.

* * * * *